United States Patent [19]

Graefe et al.

[11] Patent Number: 4,844,944
[45] Date of Patent: Jul. 4, 1989

[54] LIGHTWEIGHT, DURABLE PLUMBING FIXTURE FABRICATED FROM A DELAMINATION-RESISTANT MULTILAYER POLYMERIC COMPOSITE

[75] Inventors: Peter U. Graefe, Wayside; Karl T. Kuszaj, East Brunswick, both of N.J.

[73] Assignee: American Standard, Inc., New York, N.Y.

[21] Appl. No.: 134,822

[22] Filed: Dec. 18, 1987

[51] Int. Cl.⁴ .............................. B32B 7/04
[52] U.S. Cl. ...................... 428/357; 428/365; 428/213; 428/420; 428/423.1; 428/482; 428/483; 428/424.2; 428/506; 428/319.3; 427/400; 156/310; 4/538; 4/596; 4/619
[58] Field of Search ............ 428/35, 420, 423.1, 428/482, 35.7, 36.5, 213, 483, 424 L, 506, 319.3; 427/400; 156/310; 4/538, 596, 619

[56] References Cited

U.S. PATENT DOCUMENTS

| | | | |
|---|---|---|---|
| 3,959,521 | 5/1976 | Suetsugi et al. | 428/425 |
| 4,053,545 | 11/1977 | Fay | 428/321 |
| 4,179,760 | 12/1979 | Nakagawa | 428/483 |
| 4,333,987 | 6/1982 | Kwart et al. | 428/420 |
| 4,337,296 | 6/1982 | Varadhachary | 428/420 |
| 4,361,626 | 11/1982 | Boba et al. | 428/420 |

FOREIGN PATENT DOCUMENTS 2040676 9/1980 United Kingdom .
2148786 6/1985 United Kingdom .

Primary Examiner—Ellis P. Robinson
Assistant Examiner—J. Seidleck
Attorney, Agent, or Firm—Hoffmann & Baron

[57] ABSTRACT

A light weight, durable plumbing fixture, e.g., a bathtub, sink, shower receptor, etc., is fabricated from a multilayer polymer composite structure of high impact strength and delamination resistance. The composite possesses a relatively thin polymeric cosmetic, or finish, layer, e.g., of acrylic resin, chemically bonded to a relatively thick, reinforced, cross-linked, isocyanate-modified thermosetting polyester or polyether dense foam resin substrate layer.

17 Claims, 5 Drawing Sheets

FIG. 2
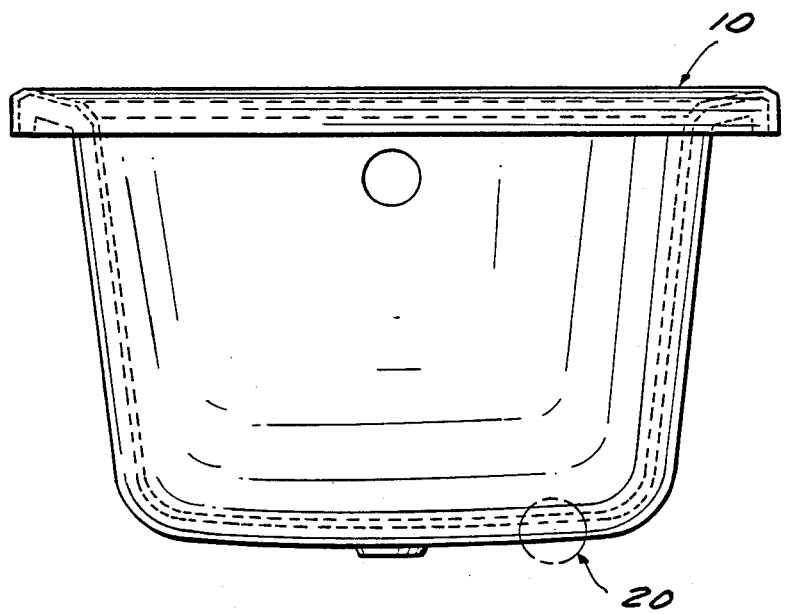
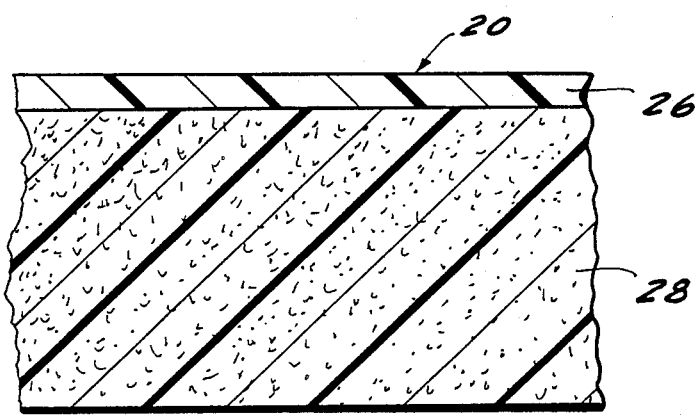
FIG. 8

FIG. 5
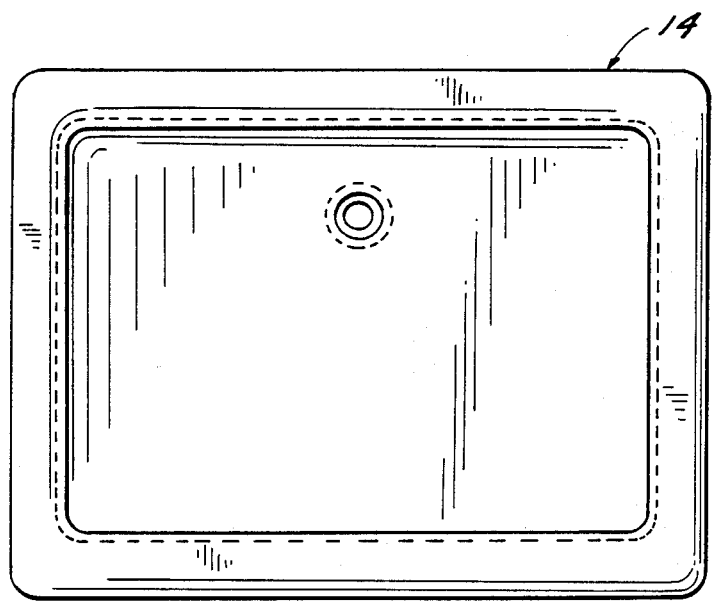
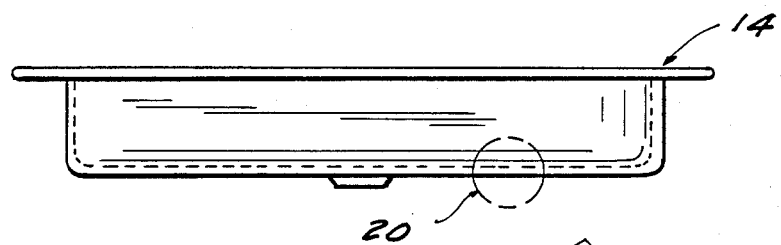
FIG. 6
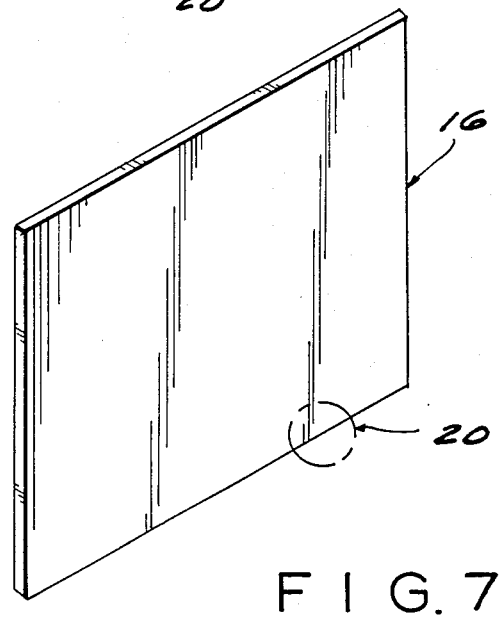
FIG. 7

LIGHTWEIGHT, DURABLE PLUMBING FIXTURE FABRICATED FROM A DELAMINATION-RESISTANT MULTILAYER POLYMERIC COMPOSITE

BACKGROUND OF THE INVENTION

This invention relates to a plumbing fixture, e.g., a bathtub, shower receptor, lavatory, kitchen sink, etc., of laminar construction fabricated from a multilayer polymeric composite in which a relatively thin polymeric cosmetic, or finish, layer is chemically bonded to a relatively thick, reinforced, cross-linked, isocyanate-modified dense thermosetting unsaturated polyester or polyether resin foam layer to provide a delamination-resistant structure.

U.S. Pat. No. 4,664,982 describes a composite structure, e.g., a reinforced enameled steel product, having high impact strength and thermal shock resistance. The composite structure is formed having bonded thereto a finish layer on one side thereof and on the other side a layer of reinforced plastic to provide a laminate. While the composite structure and the plumbing fixtures disclosed to be manufactured from it possess generally excellent physical and mechanical properties as a result of the chemical bonding, or union, of the reinforced plastic layer to the enameled steel layer. However, due to the presence of steel, the structure is fairly heavy for a given level of strength and stiffness.

U.S. Pat. No. 4,053,545 describes a laminated structural foam possessing an injection molded thermoplastic fiber-reinforced dense foam backing, e.g., one of polyethylene or polystyrene, adhesively bonded to a thermoformed finish layer, e.g., one of acrylic such as Swedcast cast acrylic sheet type 300. The laminated foam is said to be useful in the manufacture of wash basins, shower stalls, bathtub, etc. No mention or suggestion is made in this patent of chemical bonding a thermosetting foam backing layer to a thermoplastic finish layer.

U.K. Patent Specification No. 904,763 describes a bathtub possessing a basic shell formed of thermoplastic material, e.g., a polymethacrylic acid ester, and a foamed synthetic resin material basic body. A foamed synthetic resin, e.g., a polyurethane foam, interposed between the shell and basic body may be bonded thereto. Solvent or chemical bonding of adjacent lamina is neither disclosed nor suggested.

U.K. Patent Applications GB No. 2 040 676A and GB No. 2 148 786A both disclose a laminar bathtub construction in which a thermoformed acrylic surface layer is backed with a fiber-reinforced rigid backing layer. Neither disclosure suggests a chemical bonding procedure. Delamination of the finish layer from the backing layer is a problem with bathtubs and other plumbing features constructed with laminates of the type illustrated in these disclosures.

It is an object of the present invention to provide a plumbing fixture, e.g., a bathtub, shower receptor, lavatory, kitchen sink, etc., constructed from a multilayer polymeric composite which is significantly lighter than a metal-containing, e.g., steel-containing, polymeric composite for an approximately equivalent level of strength and stiffness.

It is another object of the present invention to provide a plumbing fixture molded from a multilayer polymer composite which is exceptionally resistant to delamination due to the chemical bonding of dissimilar polymer layers.

It is yet another object of the present invention to provide a plumbing fixture of composite construction which lends itself to manufacture in whole or in part by RIM or RRIM technology.

SUMMARY OF THE INVENTION

In satisfaction of these and other objects of the invention, a plumbing fixture constructed from a polymeric composite having good resistance to delamination is provided which comprises:

(a) a relatively thin polymeric cosmetic layer which, prior to the curing of a substrate layer in mutual contact therewith, possesses a chemically reactive first functionality on at least the surface thereof to be bonded to the substrate layer; and, (b) a relatively thick, reinforced, cross-linked, isocyanate-modified thermosetting unsaturated polyester and/or polyether dense foam resin substrate layer which, prior to curing, possesses a chemically reactive second functionality such that upon curing while in mutual contact with a surface of the cosmetic layer, the substrate layer becomes bonded to the cosmetic layer through chemical linkages formed by reaction of first and second functionalities.

The high strength of the chemical linkages results in a composite structure which is significantly higher in impact strength and more resistant to delamination than bonds obtained with known and conventional contact adhesives. In addition to its excellent delamination resistance, the composite-based plumbing fixture of this invention combines exceptionally light weight with a high level of mechanical strength and stiffness as well as high corrosion resistance.

BRIEF DESCRIPTION OF THE DRAWINGS

FIG. 2 is an elevational view of one end of the bathtub of FIG. 1;

FIG. 5 is a top plan view of a show receptor constructed in accordance with the invention;

FIG. 6 is an elevational view of the shower receptor of FIG. 5;

FIG. 7 is an isometric view of a panel made in accordance with the invention;

FIG. 8 is a greatly enlarged sectional view taken from within the broken line circles of FIGS. 2, 4 and 6 illustrating the composite structure of the plumbing fixtures of the invention; and, FIG. 9 is a schematic diagram of the material flow of a RRIM process for manufacturing the sanitary ware of FIGS. 1-7.

DESCRIPTION OF THE PREFERRED EMBODIMENTS

Figure 1:
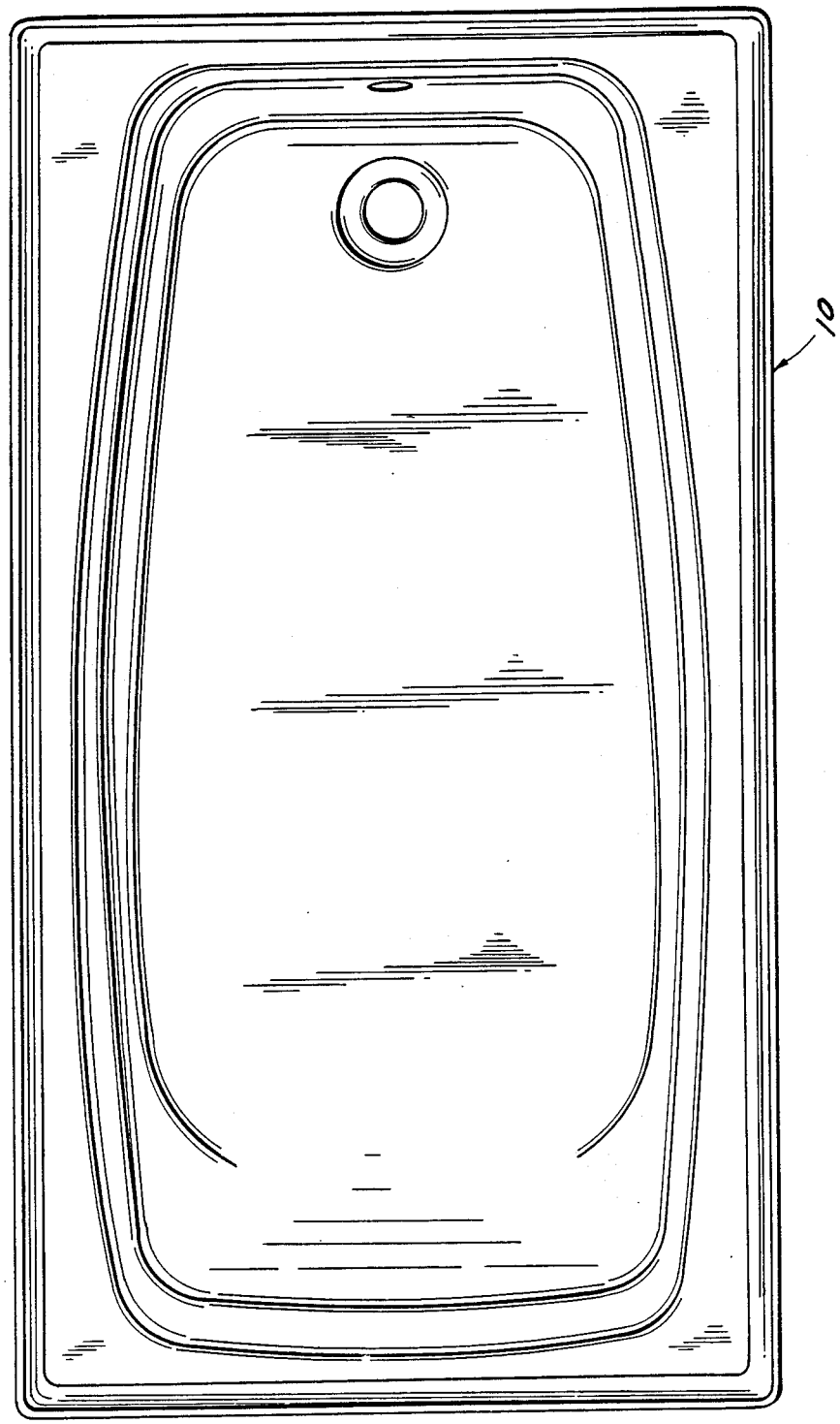
FIG. 1 is a top plan view of a bathtub constructed in accordance with the invention.

Cosmetic, or finish, layer (a) of the plumbing fixture herein can be fabricated from any one of several thermoplastic and thermosetting resins. Alloys and blends of resins are also contemplated. The selected resin is advantageously one which possesses a high glass transition temperature and good resistance to surface abrasion (scratching) since plumbing fixtures such as bathtubs, shower receptors, and the like, must function well over a broad range of temperature and retain an attractive appearance.

It is also within the scope of this invention to provide cosmetic layer (a) as two, three or even more individual layers of different thermoplastic and/or thermosetting resins. For example, an acrylonitrile-butadiene-styrene terpolymer can be arranged as the outermost layer of a two-ply laminate with a coextruded acrylonitrile-butadiene-styrene-vinyl alcohol copolymer (derived in a known manner from the hydrolysis of the corresponding acrylonitrile-butadiene-styrene-vinyl acetate copolymer) serving as the underlying layer. The resulting laminar structure possesses a chemically inert upper surface and a chemically reactive lower surface (due to the presence of hydroxyl functionality contributed by the interpolymerized vinyl alcohol monomer groups) providing sites for reaction with suitably reactive sites possessed by substrate layer (b), e.g., isocyanate groups, as will be more fully explained.

Thermoplastic materials (inclusive of all resins which can be processed, e.g., extruded, at normal thermoplastic processing temperatures) useful in providing cosmetic layer (a) include acrylonitrile-butadiene-styrene terpolymer and related resins such as acrylonitrile-chlorinated polyethylene-styrene terpolymer, acrylic-styrene-acrylonitrile terpolymer and olefin-modified styrene-acrylonitrile terpolymer; acetal homopolymer (polyoxymethylene) and copolymer; acrylic resins, in particular, polymethylmethacrylate; polyimide and bismaleimide resins; ionomer resins; melamine resins; nylon homopolymers and copolymers such as polyamide-imide; polyesters such as polyethylene terephthalate and polybutylene terephthalate; phenylene-based resins such as modified polyphenylene ether and modified polyphenylene oxide; polyarylate; sulfone polymers such as polysulfone, polyarylsulfone and polyethersulfone; olefin homopolymers and copolymers such as polyethylene, polypropylene, polybutylene, polymethylpentene, ethylene-propylene copolymer, ethylene-propylene-butylene terpolymer, ethylene-methyl acrylate copolymer, ethylene-ethyl acrylate copolymers, ethylene-vinyl acetate copolymer; polyetheretherketone; styrene homopolymers and copolymers such as polystyrene, styrene-acrylonitrile copolymer and styrene-butadiene copolymer; polyurethane, polyvinyl and polyvinylidene halides such as polyvinyl chloride, polyvinylidene chloride and polyvinyl fluoride; thermoplastic elastomers, and the like.

Alloys and blends of the foregoing which can be used to provide cosmetic layer (a) include acrylonitrile-butadiene-styrene and polycarbonate, polytetrafluoroethylene, polyvinylchloride or polysulfone; acrylic-styrene-acrylonitrile terpolymer and polyvinylchloride or polymethylmethacrylate, acetal resin and an elastomer; polyvinyl chloride and acrylic; nylon and ionomers, ethylene copolymer, ethylene-propylene-diene monomer, polyethylene or polytetrafluoroethylene; polycarbonate together with polybutylene terephthalate and an elastomer; polycarbonate and polyethylene, polyethylene terephthalate or styrene-maleic anhydride copolymer; polybutylene terephthalate and polyethylene terephthalate or an elastomer; polyethylene terephthalate and polymethyl-methacrylate, an elastomer or polysulfone; polypropylene and ethylene-propylene-diene monomer or ethylene-propylene monomer; polyethylene and polybutylene; polyolefin and ionomer resin; polyphenylene ether and polystyrene or polyamide; polyphenylene sulfide and an elastomer; styrene-acrylonitrile and ethylene-propylene-diene monomer; styrene-maleic anhydride copolymer and polystyrene; and, polyvinyl chloride and ethylene vinyl acetate, chlorinated polyethylene, nitrile rubber or polyurethane.

Among the thermosetting polymers which can be used to provide cosmetic layer (a) are amino resins; epoxy resins; phenolics; thermosetting polyesters, alkyds and polyimides; and, polyurethanes.

Cosmetic layer (a) can represent from about 0.1 to as much as about 40 pecent or more of the total thickness of the composite and for most plumbing fixtures, will vary from about 0.5 to about 25 percent of total thickness. At the lower end of these ranges, surface layer (a) can be regarded as a coating and, indeed, can be applied to a suitable temporary support, e.g., a male mold element, employing coating, spraying or similar procedures. The thickness of cosmetic layer (a) need not be uniform. In fact, it may be desired to selectively increase the thickness of cosmetic layer (a) in certain areas, e.g., where the plumbing fixture would be most subject to abrasive erosion.

Cosmetic layer (a) can contain any of numerous additives including inorganic and organic dyes, pigments, fillers, reinforcements, plasticizers, antioxidants, UV stabilizers, etc., in the usual amounts. Moreover, the exposed surface of this layer can be modified or texturized in known and conventional ways. Thus, for example, the base of a bathtub can be provided with a non-slip surface as a safety feature, a sink can be made to simulate marble for aesthetic effect, and so forth.

Substrate layer (b) is a reinforced cross-linked, isocyanate-modified, thermosetting unsaturated polyester dense foam resin, unsaturated polyether dense foam resin or mixture of such resins. Since the mechanical properties of the plumbing fixture herein will largely be due to the substrate layer (cosmetic layer (a), as its name implies, being present primarily to provide an attractive appearance, or finish, to the unit), the substrate layer will ordinarily be much thicker than the cosmetic layer. In addition, the substrate layer will contain one or more reinforcements, e.g., those based on treated or non-treated, non-woven or woven, fibers of such organic and inorganic materials as polyester, polyamide (particularly an aramid such as DuPont's Kevlar), carbon, boron, glass and hybrids of the foregoing such as aramid and carbon or glass, carbon and glass, etc., in the customary amounts. The substrate layer can optionally contain the usual amounts of treated and non-treated fillers and extenders such as calcium carbonate, kaolin, talc, alumina trihydrate, wood-and shell flours, silica, diatomaceous earth, glass spheres, wollastonite, mica and metallic powders; colorants, flame retardants; foaming agents; heat stabilizers; impact modifiers; plasticizers; and, ultraviolet stabilizers, and so forth.

In general, any of the known and conventional initially liquid, ethylenically unsaturated polyesters and polyethers possessing one or more active hydrogen-containing groups, e.g., hydroxyl, carboxylic acid, amine, etc., can be used to provide substrate layer (b) herein. The unsaturated polyesters are generally prepared by the polyesterification of polycarboxylic acid and/or polycarboxylic acid anhydrides and polyols, usually glycols. At least one of the ingredients in the polyester contains ethylenic unsaturation, usually the polycarboxylic acid or corresponding anhydride. Typical unsaturated polyester resins are fabricated from dicarboxylic acids such as phthalic acid, phthalic anhydride, adipic acid, succinic acid, tetrahydrophthalic acid or anhydride, tetrabromophthalic acid or anhydride, maleic acid or anhydride or fumaric acid. Typical glycols include ethylene glycol, propylene glycol, butylene glycol, neopentyl glycol, diethylene glycol, dipropylene glycol, polyethylene glycol and polypropylene glycol. Occasionally trihydric and higher polyols are included in the polyester such as trimethylol ethane, trimethylol propane, pentaerythritol, etc. Customarily a slight stoichiometric excess of glycol is employed in preparing the unsaturated polyester.

Unsaturated polyester resin syrups are obtained when an unsaturated polyester resin is combined with copolymerizable monomers which contain terminal vinyl groups. These monomers are well known in the art and include hydrocarbon monomers such as styrene, alphamethylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl dioxide, and the like; acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, acrylonitrile, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; vinyl and vinylidene halides, e.g., vinyl chloride, vinyl fluoride, vinylidene chloride, and the like; vinyl esters, vinyl ethers, vinyl ketones, etc., such as vinyl acetate, vinyl alcohol, vinyl butyrate, isopropenyl acetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like; butadiene, isoprene, 1,4-pentadiene, 1,6-hexadiene, 1,7-octadiene. Any of the known polymerizable monomers can be used and the compounds listed above are illustrative and not restrictive of the monomers suitable for use in this invention. Customarily the copolymerizable monomer is provided in an amount to constitute from about 10 to about 70 weight percent of the unsaturated polyester resin syrup, i.e., the unsaturated polyester resin comprises from about 9 to about 30 weight percent of the resin syrup.

A preferred type of unsaturated polyester is one possessing both terminal ethylenic saturation and at least one terminal active hydrogen-containing group such as a hydroxyl, carboxylic acid and/or an amine group. Polyesters of this type include ASHLAND V110-2 monomer (Ashland Chemical Company) and those described in U.S. Pat. No. 3,663,599, supra, the contents of which are incorporated by reference herein. The preferred unsaturated polyester is actually a mixture of polyesters of the general formula

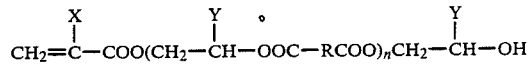

wherein X is hydrogen, methyl or ethyl, Y is hydrogen, methyl, phenyl or CH$_2$Z, in which Z is a halogen or an alkyl group, R represents an aliphatic or alicyclic group containing ethylenic unsaturation and n is an integer of from 0 to 4. The polyesters are prepared by reacting an ethylenically unsaturated carboxylic acid of the structure

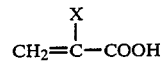

with a carboxylic acid anhydride of the structure

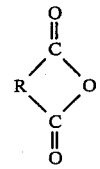

and a monoepoxide of the general formula

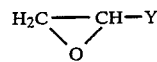

wherein the significance of X, Y and R is as stated above. Examples of suitable ethylenically unsaturated carboxylic acids include acrylic acid, methacrylic acid, ethylacrylic acid, and the like, methacrylic acid being especially preferred. Of the useful carboxylic acid anhydrides, maleic anhydride is especially preferred. Useful monoepoxides include ethylene oxide, propylene oxide, butylene oxide, styrene oxide, epichlorohydrin, methylepichlorohydrin, and the like, propylene oxide being especially preferred. An especially preferred polyester, ASHLAND V110-2 monomer (Ashland Chemical Company), is prepared by reacting methacrylic acid with maleic anhydride and propylene oxide to provide a mixture of maleate esters of the structure

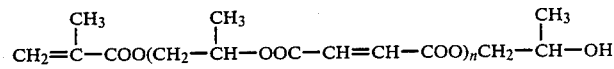

wherein n is 0 to 4. In a known manner, the maleate esters can, if desired, be isomerized to the corresponding fumarate esters, e.g., employing an amine. Reaction products obtained from the fumarate esters tend to be harder and more resistant to heat distortion than those obtained with the maleate esters.

When employing the aforesaid preferred polyesters, it is advantageous to provide them in combination with one or more copolymerizable monomers, unsaturated polyesters and/or unsaturated polyester syrups such as those previously mentioned. For example, in a mixture of such preferred polyester(s) and any of the known polyester syrups referred to above, the former can represent from about 10 to about 90, and preferably from about 20 to about 80, weight percent of the total.

Unsaturated polyethers which are useful in the preparation of the resin of substrate layer (b) can be prepared by the homopolymerization or copolymerization of alkylene oxides and unsaturated difunctional initiators such as the ethylenically unsaturated diols, dicarboxylic acids, carboxylic acid anhydrides, etc. Suitable unsaturated polyethers are described in the non-patent and patent literature, e.g., U.S. Pat. Nos. 3,654,224 and 3,917,666. The polyethers can also be combined with substantial quantities of copolymerizable monomer(s), functional group-terminated unsaturated polyester(s) and/or unsaturated polyester syrup(s) such as any of those previously described.

Cross-linking of the unsaturated polyester/polyether component(s) and copolymerization of the vinyl group-terminated monomer component of the substrate layer reaction mixture is accomplished with one or more free radical polymerization initiators, or catalysts, notably organic peroxides, including di-t-butyl peroxide, 2,5-dimethyl-2,5-dimethyl-2,5-bis(t-butylperoxy)hexane, 2,5-dimethyl-2-5-bis(t-butylperoxy)hexane-3, di-t-amyl peroxide, t-butyl-2-hydroxyethyl peroxide, a,a'-bis(t-butylperoxy)diisopropyl benzene, benzoyl peroxide, diisobutyryl peroxide, 2,4-dichlorobenzoyl peroxide, diisononanoyl peroxide, decanoyl peroxide, lauroyl peroxide, acetyl peroxide, succinic acid peroxide, bis-p-chlorobenzoyl peroxide, 2,5-dihydroperoxy-2,5-dimethylhexane, cumene hydroperoxide, t-butyl hydroperoxide, p-methane hydroperoxide, diisopropylbenzene hydroperoxide, 1,1,3,3-tetramethyl butyl hydroperoxide, dicumyl peroxide, di(n-propyl)peroxy dicarbonate, diisopropyl peroxydicarbonate, di(sec-butyl)peroxydicarbonate, di(2-ethylhexyl) peroxydicarbonate, dicyclohexyl peroxy-dicarbonate, dicetyl peroxydicarbonate, bis-(4-t-butylcyclo-hexyl)peroxydicarbonate, t-butylperoxy isopropyl monocarbonate, 2,2-azobis-(isobutyronitrile), 1,1-bis(t-butyl peroxy-3,3,5-trimethylcyclohexane, t-butyl peroxyacetate, t-butyl peroxyisobutyrate, t-butyl peroxy-2-ethylhexanoate, t-butyl peroxy pivalate, t-butyl peroxyneodecanoate, t-butyl peroxymaleic acid, di-t-butyl diperoxyphthalate, 2,5-dimethyl-2,5-bis(benzoylperoxy)hexane, 2,3-dimethyl-bis(octanoylperoxy)hexane, t-butyl peroctoate, t-butyl perbenzoate, acetylcyclohexyl sulfonyl peroxide, acetyl sec-heptyl sulfonyl peroxide, 2-t-butylazo-2-cyano-4-methoxy-4-methyl pentane, 2-t-butylazo-2-cyano-4-methyl pentane, 2-t-butylazo-2-cyanopropane, methyl ethyl ketone peroxide, 2,4-pentanedione peroxide, cyclohexanone peroxide, etc. The concentration of free radical polymerization initiator is not critical and can be varied within wide limits. Up to a certain point (which can be readily experimentally determined for a given reaction mixture), increases in the concentration of the initiator/catalyst component tend to result in increased cross-linking and vinyl monomer copolymerization but in initiator/catalyst increases beyond this point are unlikely to significantly affect conversion. As a representative range, the concentration of initiator/catalyst can vary from about 0.1 to about 5 weight percent based on the total weight of unsaturated polyester, polyether and vinyl group-terminated monomer.

The foregoing unsaturated polyester/polyether component(s) are modified with one or more organic polyisocyanates such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluene diisocyanate, 2,6-toluene diisocyanate, 4,4'-diphenylmethane diisocyanate (MDI), 2,2-diphenylpropane-4,4'-diisocyanate, p-phenylene diisocyanate, xylylene diisocyanate, 12,4-naphthylene diisocyanate, 1,5-naphthylene diisocyanate, diphenyl 4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, 4,4',4'-triisocyanatotriphenylmethane, 1,3,5-triisocyanato benzene, 2,4,6-triisocyanato toluene, 4,4'-dimethyl diphenylmethane-2,2',5,5'-tetraisocyanate, furfurylidene diisocyanate, and the like, as well as their mixtures.

The term "organic polyisocyanate" or, simply, "isocyanate" includes the isocyanate-terminated reaction products resulting from the reaction of the foregoing isocyanates with a polyol. Quasi-prepolymers such as the reaction products of excess tolylene diisocyanate and short chain polyoxypropylene diols or triols are preferred in those instances where ease of processing is desired. The term "organic polyisocyanate" also includes the known and conventional dimer and trimer (isocyanurate) analogs of the foregoing isocyanates. A preferred isocyanate of this type is TDI dimer which is commercially available or can be synthesized from commercially available TDI. In general, it is especially preferred to use the readily accessible polyisocyanates such as 2,4- and 2,6-tolylene diisocyanate and mixtures of these isomers ("TDI"), polyphenylpolymethylene polyisocyanates of the type obtained by condensing aniline with formaldehyde, followed by phosgenation, "crude" MDI and distilled or "pure" MDI, and polyisocyanates containing carbodiimide groups, urethane groups, allophanate groups, isocyanurate groups, urea groups or biuret groups ("modified polyisocyantes"). Each of these materials is well known in the patent literature. Further typical examples of modified liquid MDI types of isocyanates are described in U.S. Pat. No. 3,384,653 and various quasi-prepolymers are described in U.S. Pat. Nos. 3,394,164; 3,644,457; 3,457,200; 3,883,771; 4,469,616; and 4,559,366, the disclosures of which are incorporated by reference herein.

The amount of organic polyisocyanate used is not critical and preferably ranges from an amount that provides from about 0.9 to about 1.2 isocyanate groups per active hydrogen-containing group of the unsaturated polyester/polyether. These amounts are suitable when the compositions are cast in a mold. Where RIM or RRIM techniques are used or a low pressure molding or sheet molding technique is employed, the range preferably is from about 1 to about 1.1 isocyanate groups per active hydrogen-containing group. Catalysts which are useful in effecting the urethane-modifying reaction include (a) tertiary amines such as bis(dimethylaminoethyl) ether, trimethylamine, triethylamine, N-methylmorpholine, N-ethylmorpholine, N,N-dimethylbenzlamine, N,N-dimethylethanolamine, N,N,N',N'-tetramethyl-1,3-butanediamine, triethylanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicyclaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$ and the like; (f) alcoholates and phenolates of various metals such as $Ti(OR)_4$, $Sn(OR)_4$, $Sn(OR)_2$, $Al(OR)_3$, and the like; wherein R is alkyl or aryl, and the reaction products of alcoholates with carboxylic acids, beta-diketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni and Cu, including, for example, sodium acetate, potassium laurate, calcium hexanoate, stannous acetate, stannous octoate, stannous oleate, lead octoate, metallic driers such as manganese and cobalt naphthenate, and the like; and, (h) organometallic derivatives of tetravalent tin, trivalent and pentavalent As, Sb, and Bi and metal carbonyls of iron and cobalt.

The organotin compounds deserve particular mention as catalysts for catalyzing the urethane-modifying reaction. These compounds include the dialkyltin salts of carboxylic acids, e.g., dibutyltin diacetate, dibutyltin dilaurate, dibutyltin maleate, dilauryltin diacetate, dioctyltin diacetate, dibutylin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, bitutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts or combinations of metal catalysts can also be employed as the accelerating agents without the use of amines. The catalysts for catalyzing the urethane-modifying reaction are employed in small amounts, for example, from about 0.001 percent to about 5 percent, based on the combined weight of the polyisocyanate and the unsaturated polyester/polyether.

An extender can also be added to the reaction mixture providing substrate layer (b) in order to improve the load bearing and modulus properties of the cured material. Suitable extenders include low molecular weight polyols including ethylene glycol, diethylene glycol, 1,4-butanediol and the aromatic glycols, reaction products of alkylene oxides with aromatic amines or alcohols having two active hydrogens. Suitable aromatic glycols are the reaction products of alkylene oxides with amino aryl compounds and di(hydroxyalkoxy)aryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and phenol-aromatic amine-aldehyde resins which are made by the reaction of a phenol such as phenol itself or a substituted phenol having at least one unsubstituted reactive position on the aromatic nucleus, an aldehyde such as formaldehyde or other aliphatic aldehyde and an aromatic amine such as aniline or other aromatic amine having at least one or two amino hydrogens and no or one nitrogen-bonded alkyl group and at least one unsubstituted position ortho or para to the amino group.

Foaming of the substrate layer can be accomplished by employing a small amount of a blowing agent, such as $CO_2$ produced by water included in the reaction mixture (for example, from about 0.1 to about 5 weight percent of water, based upon total weight of the total reaction mixture, i.e., ethylenically unsaturated monomers, organic polyisocyanates, catalysts and other additives), or through the use of blowing agents which are vaporized by the exotherm of the reaction, or by a combination of the two methods. Illustrative blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The quantity of blowing agent employed will vary with such factors as the density desired in the foamed product. In general, foam densities of from about 20 to about 90, and preferably from about 40 to about 70, lbs per cubic foot are suitable.

It may be advantageous to include small amounts, e.g., about 0.01 percent to 5.0 percent by weight based on the total substrate layer reaction mixture, of a foam stabilizer, e.g., a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as those described in U.S. Pat. No. 3,505,377 and U.K. patent specification No. 1,220,471. These various polysiloxanepolyoxyalkylene block copolymers preferably contain from about 5 to about 50 weight percent of polysiloxane polymer with the remainder being polyoxyalkylene polymer.

There are a number of ways in which the cosmetic layer and the substrate layer can be provided with, respectively, the first and second chemically reactive functionalities. So, for example, the cosmetic layer can be comprised of a polymer which contains chemically reactive groups within its structure, e.g., hydroxyl groups as in the previously mentioned case of an acrylonitrile-butadiene-styrene-vinyl alcohol resin. Another approach is to provide the cosmetic layer as a blend of two or more resins at least one of which possesses chemically reactive groups within its structure.

One convenient way in which such a blend can be provided is to apply to a surface of the cosmetic layer, e.g., one of acrylic resin, a primer, or chemical bonding agent, which is a solution of thermosetting phenolic resin capable of dissolving the cosmetic layer. In the case of an acrylic cosmetic layer, the presence of methyl methacrylate monomer in the primer will result in some dissolution of the resin, e.g., to a level of from about 0.5 to about 10 percent or more of the thickness of the layer depending upon the amount of monomer present and the duration of contact with the surface of the layer to which it has been applied. The primer can be applied one or more times in any suitable way, e.g., by brushing, spraying, etc. Within a short time of its application, e.g., from about 10 seconds to about 10 minutes (or longer if desired), the relatively volatile solvent component of the primer will have substantially evaporated leaving a surface containing chemically free hydroxyl groups. The affected surface of the acrylic layer will remain chemically reactive for a relatively long period, e.g., up to 24 hours or even longer, following application of the primer. As a result of the foregoing partial dissolution of acrylic resin, the thermosetting phenolic resin will become blended therewith thereby effectively incorporating free hydroxyl functionality in the cosmetic layer which is available to react with free isocyanate functionality present in the precursor components of the substrate layer. As a result of the curing of the substrate layer, the hydroxyl groups present in the acrylic layer will have undergone reaction with the isocyanate groups in the substrate layer to form relatively strong urethane linkages which chemically unite the two layers.

In yet another variation of the chemical bonding system described above, chemically reactive groups present on the cosmetic layer and in the precursor components of the substrate layer can be made to react with a coupling agent containing appropriate chemically reactive functionalities. For example, the free hydroxyl groups of a primer-coated acrylic cosmetic layer and free isocyanate groups within the pre-cured substrate layer will react with a dicarboxylic acid such as maleic acid (which may initially be present as the corresponding anhydride) or a hydroxy-carboxylic acid such as 1-hydroxycaproic acid (which may initially be present at the corresponding lactone) present in either layer, and preferably the substrate layer, to provide chemical bonding between the two layers, e.g., ester linkages or a combination of ester and urethane linkages, resulting from the curing operation.

The strength of the bonding between the cosmetic and substrate layers, and therefore the impact strength and resistance to delamination of the composite constituting the structure of the plumbing fixture, depends to a large extent on the type and number of chemical linkages present. For a given cosmetic layer (a) and substrate layer (b), it is a fairly simple matter to determine the optimum compositional and processing variables required to achieve a predetermined bond strength. Ordinarily, in accordance with the present invention, one can typically obtain bond strengths on an order of from about 80 to about 150 lbs with from about 100 to about 130 lbs being routinely achievable. Such bond strengths impart a high level of impact resistance to the plumbing fixture of this invention as well as a high level of resistance to delamination when the plumbing fixture is subjected to an abrupt change of temperature, e.g., change to or from ambient temperature and 180° F., rapid temperature changes of this magnitude being typically encountered with bathtubs, wash sinks, etc.

Although a variety of fabrication techniques can be used to provide the composite-based plumbing fixture herein, the considerable production economies realized with RIM and RRIM procedures make these especially useful techniques for practicing the invention. RIM and RRIM are useful both in the case of unfoamed as well as foamed substrates. Packing densities, i.e., the ratio of the volume of resin mixture to the volume of the mold, of from about 20% to about 100% are advantageously employed.

Figure 3:
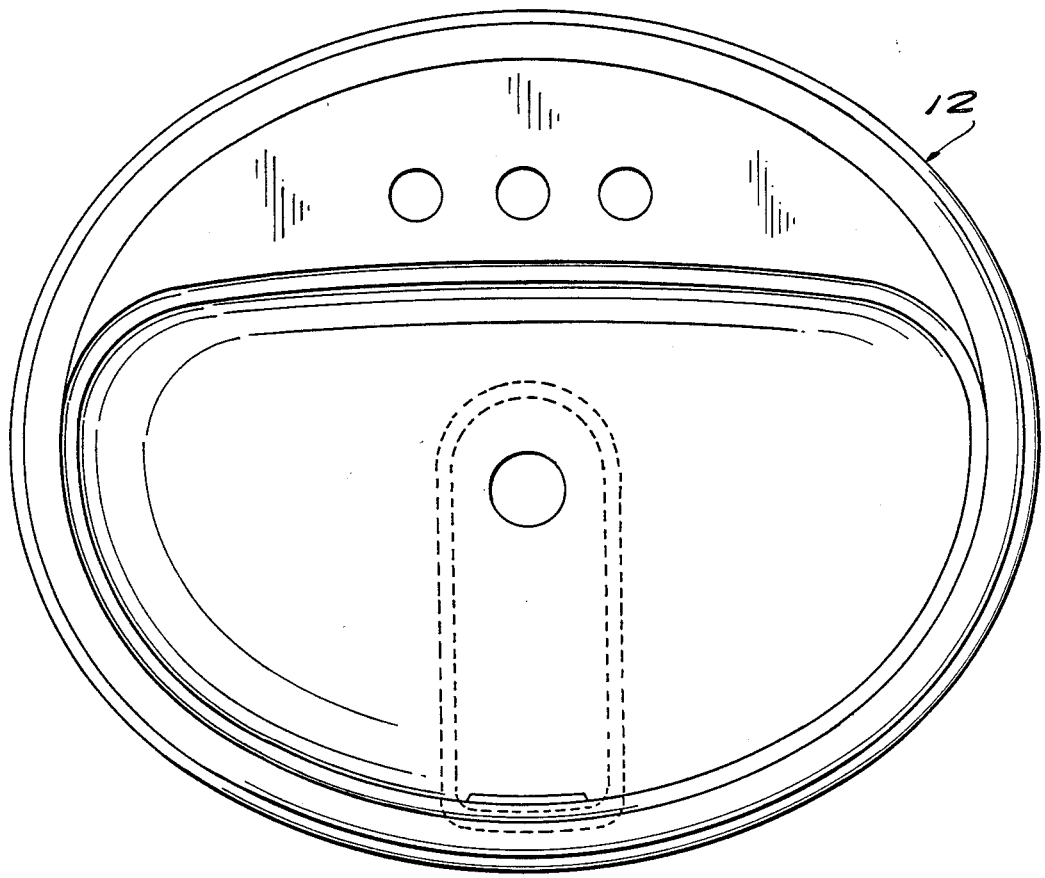
FIG. 3 is a top plan view of a lavatory constructed in accordance with the invention.
Figure 4:
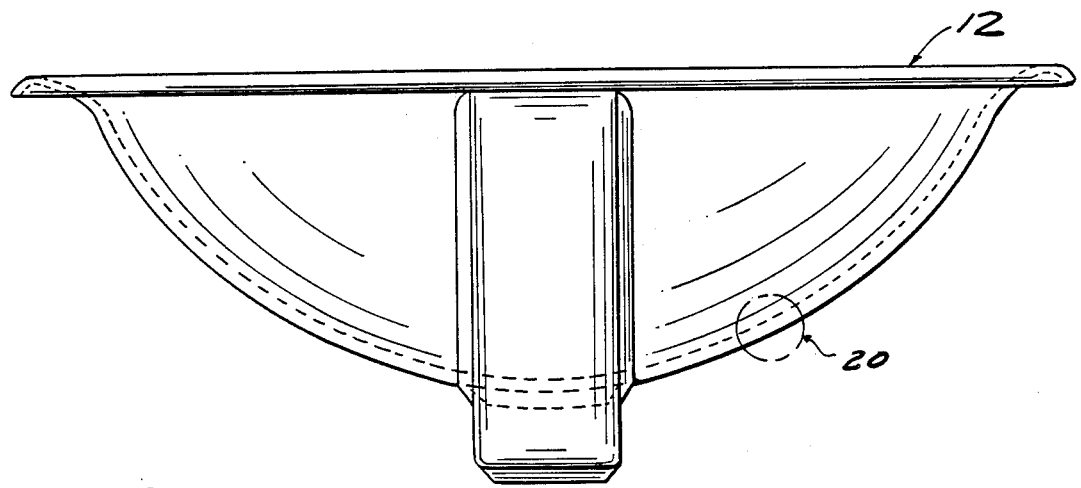
FIG. 4 is an elevational view of the lavatory of FIG. 3.

Referring now to the drawings, plumbing fixtures (FIGS. 1 and 2: bathtub 10; FIGS. 3 and 4: lavatory 12; FIGS. 5 and 6; shower receptor 14; and FIG. 7: panel 16) are fabricated in their entirely from the multilayer polymeric composite of this invention, (an enlarged cross section of which is schematically illustrated in FIG. 8).

Polymer composite 20 of FIG. 8 includes a cosmetic, or finish, layer 26 which is chemically bonded to reinforced, cross-linked isocyanate-modified dense thermosetting unsaturated polyester dense foam substrate layer 28 through urethane linkages formed during the curing of layer 26. The average thickness of cosmetic layer 26, advantageously fabricated from a glossy, abrasion-resistant resin such as polymethacrylate, can range from about 0.5 to about 5 cm. The average thickness of dense foam substrate layer 28 can range from about 50 to about 25 cm and the density of the foam can range from about 20 to about 90 lbs per cubic foot.

Figure 9:
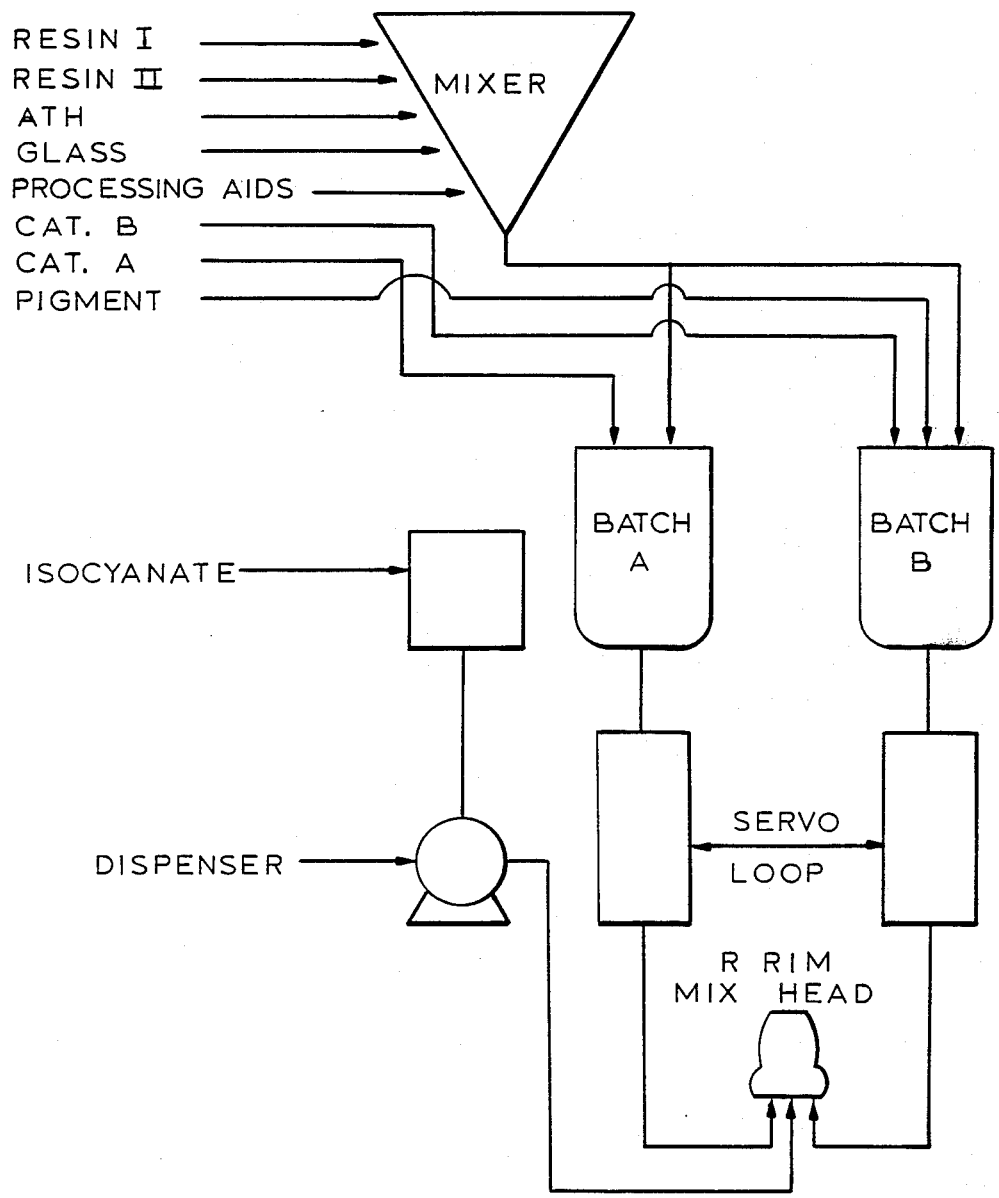

Polymer composite 20 can be manufactured in various ways, e.g., by spray-up, hand lay-up, RIM, RRIM or RTM techniques. FIG. 9 schematically illustrates the use of known and conventional RRIM procedures in manufacturing the bathtub of FIGS. 1-2. In accordance with these procedures, an acrylic sheet of approximately 3 cm average thickness which has been thermoformed to provide a shell, or insert, conforming to the shape of the finished bathtub is supported on one surface of a male mold element. A solution of chemical bonding agent containing 50 weight parts of a thermosetting phenolic resin (25 weight percent), thermoplastic urethane elastomer (2 weight percent) and organo functional silane (1 weight percent) in a solvent system containing alcohol (2 weight percent), methyl ethyl ketone (35 weight percent), ethylene glycol monoethyl ether acetate (28 weight percent) and xylene (7 weight percent) and 50 weight parts of methyl methacrylate solvent is applied to the exposed surface of the acrylic insert. The methyl methacrylate component of the bonding agent causes some superficial dissolution of the surface of the acrylic sheet with the result that the thermosetting phenolic component of the bonding agent and the dissolved acrylic resin form a solution, or blend, presenting free hydroxyl groups for reaction with free isocyanate groups in the later-applied reaction mixture providing the substrate layer.

The components of the reinforced isocyanate-modified polyester dense foam reaction mixture which upon curing will provide the substrate layer of the bathtub structure are formulated into two separate batches, Batch A and Batch B. Initially, a mixing operation is carried out to provide the following Pre-Batch Mix:

| | Pre-Batch Mix |
|---|---|
| Weight Parts | Component |
| 80 | Unsaturated Polyresin Syrup containing Vinyl |

-continued

| Weight Parts | Pre-Batch Mix Component |
|---|---|
|  | Comonomer (Pioneer 236) |
| 20 | ASHLAND V110-2 Monomer (Ashland Chemical Company) |
| 100 | Aluminum trihydrate (as fire retardant) |
| 30 | ¼″ chopped glass fiber reinforcement |
| 0.3 | Silicone Surfactant (Dow Corning 193) |

Approximately equal amounts of the foregoing Pre-Batch Mix are incorporated in Batches A and B formulated as follows:

| Weight Parts | Component |
|---|---|
|  | Batch A |
| ~115 | Pre-Batch Mix |
| 3 | Catalyst A (Dimethylethanolamine) |
|  | Batch B |
| ~115 | Pre-Batch Mix |
| 1 | Catalyst B (Cumene Hydroperoxide) |
| 1 | Pigment |

Batches A and B are combined at the RRIM mixing head together with 20 weight parts of polymethylene polyphenylisocyanate (Papi 901 from Upjohn). A servo loop is provided to monitor and adjust the ratios of Batches A and B prior to reaching the mixing head. Within 2–4 minutes of the injection of a predetermined quantity of the combined batch reaction mixture into the closed mold (injection time of about 6–8 seconds), the composite structure possessing a dense foam substrate thickness of about 30 cm and a density of about 60 lb per cubic foot has attained a sufficient level of cure to permit demolding.

The bathtub resulting from the foregoing RRIM molding operation is highly resistant to delamination when subjected to high impact forces or thermal shock. The surface of acrylic cosmetic layer 26 is resistant to chipping, cracking or crazing when subjected to direct impact forces and resists deformation and pop off when the bathtub is subjected to flexural forces such as may be encountered during shipping and/or installation.

What is claimed is:

1. A plumbing fixture constructed from a cured polymeric composite having good resistance to delamination which comprises:
   (a) a relatively thin polymeric cosmetic layer which, prior to the curing of a substrate layer in mutual contact therewith, possesses a chemically reactive first functionality on at least the surface thereof to be bonded to the substrate layer; and,
   (b) said substrate layer includes a relatively thick, reinforced, cross-linked isocynate-modified thermosetting unsaturated mixture of polyester and polyether dense foam resin which said substrate layer, prior to curing, possesses a chemically reactive second functionality such that upon curing while in mutual contact with a surface of the cosmetic layer, the substrate layer becomes bonded to the cosmetic layer through chemical linkages formed by reaction of said first and second functionalities.

2. The plumbing fixture of claim 1 wherein the polymeric cosmetic layer comprises at least one polymer which possesses the chemically reactive first functionality as part of its molecular structure.

3. The plumbing fixture of claim 1 wherein the polymeric cosmetic layer comprises a first polymer which lacks chemically reactive first functionality but at least at its surface is blended with a second polymer which possesses chemically reactive first functionality.

4. The plumbing fixture of claim 1 wherein the first functionality is an acrylic resin and the second functionality is a free hydroxyl group-containing thermosetting phenolic resin.

5. The plumbing fixture of claim 1 wherein the polyester of the substrate layer is derived from a mixture of unsaturated liquid polyesters at least one of which possesses terminal ethylenic unsaturation and at least one functional group selected from the group consisting of hydroxyl, carboxylic acid and amine groups.

6. The plumbing fixture of claim 1 wherein the polyester of the substrate layer is derived from a mixture of unsaturated liquid polyesters at least one of which is obtained by reacting methacrylic acid, maleic anhydride and propylene oxide.

7. The plumbing fixture of claim 6 wherein said substrate layer includes a fumarate ester-monoalcohol formed by the isomerization of maleate ester obtained from said reaction of methacrylic acid, maleic anhydride and propylene oxide.

8. The plumbing fixture of claim 1 wherein the polymeric cosmetic layer comprises an acrylic resin, the surface of which in mutual contact with the substrate layer is a blend of the acrylic resin and a free hydroxyl group-containing thermosetting resin, the polyester of the substrate layer is a reinforced, dense, foamed polyester resin possessing, prior to curing, free isocyanate groups, the cosmetic layer being chemically bonded to the cured substrate layer through urethane linkages.

9. The plumbing fixture of claim 1 which is a bathtub.

10. The plumbing fixture of claim 1 which is a sink or basin.

11. The plumbing fixture of claim 1 which is a shower receptor.

12. The plumbing fixture of claim 1 which is a wall panel associated with a shower receptor.

13. A plumbing fixture constructed from a cured polymeric composite having good resistance to delamination which comprises:
   (a) a relatively thin cosmetic layer fabricated from an acrylic resin which, prior to the curing of a substrate layer in mutual contact therewith, possesses a free hydroxyl group-containing component on at least the surface thereof to be bonded to the substrate layer; and,
   (b) said substrate layer includes a relatively thick, reinforced, cross-linked, isocyanate-modified contacting thermosetting unsaturated mixture of polyester and polyether dense foam which said substrate layer prior to curing, possesses a free isocyanate group-containing component such that upon curing while in mutual contact with the cosmetic layer, the substrate layer becomes bonded to the cosmetic layer through urethane linkages formed by reaction of free hydroxyl groups of the cosmetic layer with free isocyanate groups of the substrate layer.

14. The plumbing fixture of claim 13 which is a bathtub.

15. The plumbing fixture of claim 13 which is a sink or basin.

16. The plumbing fixture of claim 13 which is a shower receptor.

17. The plumbing fixture of claim 13 which is a wall panel associated with a shower receptor.

* * * * *